United States Patent
Masse et al.

(10) Patent No.: US 12,442,055 B2
(45) Date of Patent: Oct. 14, 2025

(54) METHOD FOR PRODUCING A COATED STEEL SHEET HAVING IMPROVED STRENGTH, DUCTILITY AND FORMABILITY

(71) Applicant: ArcelorMittal, Luxembourg (LU)

(72) Inventors: Jean-Philippe Masse, Grenoble (FR); Jean-Christophe Hell, Maizieres-les-Metz (FR)

(73) Assignee: ArcelorMittal, Luxembourg (LU)

( * ) Notice: Subject to any disclaimer, the term of this patent is extended or adjusted under 35 U.S.C. 154(b) by 548 days.

(21) Appl. No.: 15/502,264

(22) PCT Filed: Aug. 7, 2015

(86) PCT No.: PCT/IB2015/056029
§ 371 (c)(1),
(2) Date: Feb. 7, 2017

(87) PCT Pub. No.: WO2016/020899
PCT Pub. Date: Feb. 11, 2016

(65) Prior Publication Data
US 2017/0233847 A1   Aug. 17, 2017

(30) Foreign Application Priority Data
Aug. 7, 2014   (WO) .................. PCT/IB2014/001492

(51) Int. Cl.
*C21D 9/46*   (2006.01)
*B32B 15/01*   (2006.01)
(Continued)

(52) U.S. Cl.
CPC .............. *C21D 9/46* (2013.01); *B32B 15/012* (2013.01); *B32B 15/013* (2013.01); *C21D 1/185* (2013.01);
(Continued)

(58) Field of Classification Search
CPC . C21D 9/46; C21D 1/185; C21D 1/19; C21D 1/26; C21D 2211/001;
(Continued)

(56) References Cited

U.S. PATENT DOCUMENTS 4,390,377 A * 6/1983 Hogg ..................... C21D 8/06
148/518
5,123,969 A * 6/1992 Chou ..................... C22C 38/00
148/328
(Continued)

FOREIGN PATENT DOCUMENTS

CN     101035921       9/2007
CN     102534132 A     7/2012
(Continued)

OTHER PUBLICATIONS

Wang, Li, and John G. Speer. "Quenching and Partitioning Steel Heat Treatment." Metallography, Microstructure, and Analysis, vol. 2, No. 4, 2013, pp. 268-281 (Year: 2013).*
(Continued)

*Primary Examiner* — John A Hevey
(74) *Attorney, Agent, or Firm* — Davidson Kappel LLC

(57) ABSTRACT

The invention relates to a method for producing a high strength coated steel sheet having a yield stress YS>550 MPa, a tensile strength TS>980 MPa, and improved formability and ductility. The steel contains: $0.15\% \leq C \leq 0.25\%$, $1.2\% \leq Si \leq 1.8\%$, $2\% \leq Mn \leq 2.4\%$, $0.1\% \leq Cr \leq 0.25\%$, $Al \leq 0.5\%$, the balance being Fe and unavoidable impurities. The sheet is annealed at a temperature between $TA1=Ac3-0.45*(Ms-QT)$ and $TA2=830°$ C. for at least 30 s then quenched by cooling it to a quenching temperature QT between 180° C. and 300° C., then heated to a partitioning temperature PT between 380° C. and 480° C. and maintained at this temperature for a partitioning time Pt between 0 sec and 300 sec, then either hot dip coated and cooled to the room tempera-
(Continued)

ture with a cooling rate of at least 25° C./s below 300° C., or directly cooled to the room temperature with a cooling rate of at least 25° C./s and further electro-galvanized, or cooled to the room temperature with a cooling rate of at least 25° C./s without coating. The steel according to the invention contains 5% to 25% of intercritical ferrite, at least 50% of partitioned martensite, at least 10% of residual austenite, less than 10% of fresh martensite, and bainite, the sum of partitioned martensite and bainite being at least 60%. It also relates to the obtained coated or non coated sheet.

24 Claims, 1 Drawing Sheet

(51) Int. Cl.
*C21D 1/18* (2006.01)
*C21D 1/19* (2006.01)
*C21D 1/26* (2006.01)
*C22C 38/02* (2006.01)
*C22C 38/06* (2006.01)
*C22C 38/34* (2006.01)
*C22C 38/38* (2006.01)
*C23C 2/02* (2006.01)
*C23C 2/06* (2006.01)
*C23C 2/12* (2006.01)
*C23C 2/40* (2006.01)
*C23F 17/00* (2006.01)
*C25D 3/22* (2006.01)
*C25D 3/56* (2006.01)

(52) U.S. Cl.
CPC ............... *C21D 1/19* (2013.01); *C21D 1/26* (2013.01); *C22C 38/02* (2013.01); *C22C 38/06* (2013.01); *C22C 38/34* (2013.01); *C22C 38/38* (2013.01); *C23C 2/02* (2013.01); *C23C 2/022* (2022.08); *C23C 2/0224* (2022.08); *C23C 2/024* (2022.08); *C23C 2/06* (2013.01); *C23C 2/12* (2013.01); *C23C 2/40* (2013.01); *C23F 17/00* (2013.01); *C25D 3/22* (2013.01); *C25D 3/565* (2013.01); *C21D 2211/001* (2013.01); *C21D 2211/002* (2013.01); *C21D 2211/005* (2013.01); *C21D 2211/008* (2013.01)

(58) Field of Classification Search
CPC ........ C21D 2211/002; C21D 2211/005; C21D 2211/008; C21D 1/34; C21D 8/0205; C21D 8/0247; C21D 1/18; C21D 8/02; B32B 15/012; B32B 15/013; C22C 38/02; C22C 38/06; C22C 38/34; C22C 38/38; C22C 38/04; C22C 38/18; C23C 2/02; C23C 2/06; C23C 2/12; C23C 2/40; C23C 2/022; C23C 2/0224; C23C 2/024; C23C 2/00; C23F 17/00; C25D 3/22; C25D 3/565

See application file for complete search history.

(56) References Cited

U.S. PATENT DOCUMENTS

| | | | | |
|---|---|---|---|---|
| 6,264,770 B1 * | 7/2001 | Hong | ...................... | C21D 1/78 |
| | | | | 148/663 |
| 8,876,987 B2 | 11/2014 | Matsuda et al. | | |
| 9,290,834 B2 * | 3/2016 | Hasegawa | ................. | C23C 2/06 |
| 9,970,092 B2 | 5/2018 | Nozaki et al. | | |
| 2009/0314395 A1 | 12/2009 | Nonaka et al. | | |
| 2014/0170439 A1 * | 6/2014 | Allain | ...................... | C21D 1/20 |
| | | | | 428/659 |
| 2014/0242416 A1 * | 8/2014 | Matsuda | ................. | C22C 38/08 |
| | | | | 428/659 |
| 2014/0338798 A1 * | 11/2014 | Thomas | ................. | C22C 38/22 |
| | | | | 148/533 |
| 2015/0013856 A1 * | 1/2015 | Murakami | ............. | C22C 38/20 |
| | | | | 148/624 |
| 2015/0337408 A1 * | 11/2015 | Schulz | .................... | C21D 1/74 |
| | | | | 420/110 |

FOREIGN PATENT DOCUMENTS

| | | | |
|---|---|---|---|
| CN | 103827335 A | 5/2014 | |
| EP | 2202327 A1 | 6/2010 | |
| EP | 2762589 A1 | 8/2014 | |
| EP | 2762590 A1 | 8/2014 | |
| EP | 2765212 A1 | 8/2014 | |
| WO | 20121200020 A1 | 9/2012 | |
| WO | 2014186722 A2 | 11/2014 | |
| WO | 2016020899 A1 | 2/2016 | |

OTHER PUBLICATIONS

Speer, J.G., Wang, L., Quenching and Partitioning Steel Heat Treatment. Metallogr. Microstruct. Anal. 2, 268-281 (2013) (Year: 2013).*
Manohar, Priyadarshan, Grain growth and continuous cooling transformation behavior of austenite in Ti—Nb—Mn—Mo microalloyed steels, Doctor of Philosophy thesis, Department of Materials Engineering, University of Wollongong, 1997 (Year: 1997).*
Speer J G et al. "Analyisis of Microstructure Evolution in Quenching and Partitioning Automotive Sheet Steel", Matallurgical and Materials Transactions A: Physical Metallurgy and Materials Science Dec. 2011 Springer Boston USA, vol. 42, No. 12, Dec. 2011, pp. 3591-3601.
Speer J. et al. "The quenching and partitioning process: background and recent progress" Materials Research, Apr. 1, 2008, pp. 417-423, vol. 8 No. 4.
De Knijf D. et al. "Effect of fresh martensite on the stability of retained austenite in quenching and partitioning steel" Materials Science and Engineering A: Structrual Materials: Properties, Microstructures and Processing, Jul. 28, 2014, pp. 107-115, vol. 615, Esevier BV, NL.
D. Muller, "Die Warmebehandlung metallischer Werkstoffe", Jun. 18, 2011, Folien 1-65, See English translation.
K. W. Andrews, Journal of the Iron and Steel Institute, Jul. 1965, pp. 721-727.
M.J. Santofimia, L. Zhao, J. Sietsma, Metallurgical and Materials Transactions A (2011), vol. 42A, pp. 3620-3626.
B.C. De Cooman, J. G. Speer, steel research int. 77 (2006) No. 9-10, pp. 634-640.
A. Clarke, ‚Carbon Partitioning into Austenite from Martensite in Silicon-containing high strength steel, PhD thesis, Colorado School of Mines (2006).
International Patent Application PCTIB2014001492, filed on Aug. 7, 2014.
Speer, Rizzo, Matlock, Edmonds: The "quenching and Partitioning" Process: Background and Recent Progress, Material Research, vol. 8, No. 417-423, 2005.

* cited by examiner

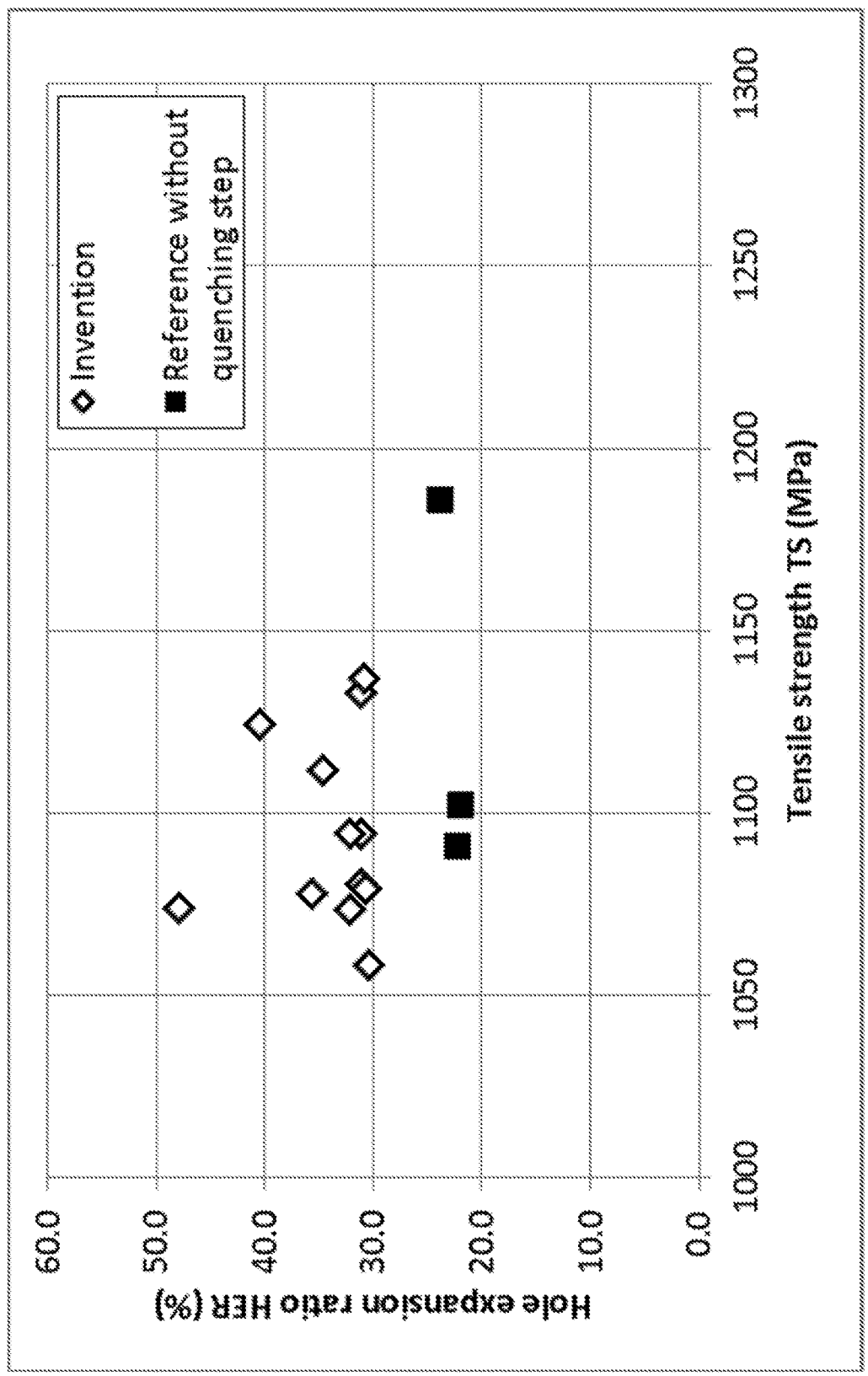

METHOD FOR PRODUCING A COATED STEEL SHEET HAVING IMPROVED STRENGTH, DUCTILITY AND FORMABILITY

The present invention relates to a method for producing a high strength coated steel sheet having improved strength, ductility and formability and to the sheets obtained with the method.

To manufacture various equipments such as parts of body structural members and body panels for automotive vehicles, it is usual to use coated sheets made of DP (dual phase) steels or TRIP (transformation induced plasticity) steels.

For example, such steels which include a martensitic microstructure and/or some retained austenite and which contain about 0.2% of C, about 2% of Mn, about 1.7% of Si have a yield strength of about 750 MPa, a tensile strength of about 980 MPa, a total elongation of more than 8%. These sheets are produced on continuous annealing line by quenching from an annealing temperature higher than $Ac_3$ transformation point, down to an overaging temperature above Ms transformation point and maintaining the sheet at the temperature for a given time. Then the sheet is either hot dip galvanized or electro-galvanized.

To reduce the weight of the automotive so as to improve their fuel efficiency in view of the global environmental conservation, it is desirable to have sheets having improved yield and tensile strength. But such sheets must also have a good ductility and a good formability.

In this respect, it is desirable to have sheets having a yield strength YS of at least 550 MPa, a tensile strength TS of about 980 MPa, a uniform elongation of at least 12% and a total elongation of at least 18%. Moreover, it is also desirable to have sheets having high resistance to damage, i.e. a hole expansion ratio HER of at least 30%. The hole expansion ratio referred to in the whole description and in the claims is measured according to the standard ISO16630: 2009. Therefore, the purpose of the present invention is to provide such sheet and a method to produce it.

Therefore, the invention relates to a method for producing a steel sheet having a microstructure containing between 5% and 25% of intercritical ferrite, at least 10% of retained austenite, at least 50% of partitioned martensite, less than 10% of fresh martensite, and bainite, the sum of partitioned martensite and bainite being at least 60%, by heat treating a steel sheet wherein the chemical composition of the steel contains in weight %:

$0.15\% \leq C \leq 0.25\%$ $1.2\% \leq Si \leq 1.8\%$ $2\% \leq Mn \leq 2.4\%$ $0.1\% \leq Cr \leq 0.25\%$ $Al \leq 0.5\%$ the balance being Fe and unavoidable impurities, and wherein the heat treatment and coating operations comprise the successive following steps:

Heating and annealing the sheet at an annealing temperature TA between TA1=Ac3−0.45*(Ms−QT) where QT is the quenching temperature between 180° C. and 300° C. and TA2=830° C. for a time of more than 30 sec, quenching the sheet by cooling it down to the quenching temperature QT between 180° C. and 300° C.

heating the sheet up to a partitioning temperature PT between 380° C. and 480° C. for a partitioning time Pt between 10 sec and 300 sec, cooling the sheet to the room temperature with a cooling rate of at least 25° C./s.

Preferably, the method according to the invention is such that: $0.17\% \leq C \leq 0.21\%$.

In another embodiment, the method according to the invention is such that: $1.3\% \leq Si \leq 1.6\%$.

In another embodiment, the method according to the invention is such that: $2.1\% \leq Mn \leq 2.3\%$.

In a preferred embodiment, the method according to the invention is such that the partitioning temperature PT is between 430° C. and 480° C. for a partitioning time between 10 s and 90 s.

In another embodiment, the method according to the invention is such that the partitioning temperature PT is between 380° C. and 430° C. for a partitioning time between 10 s and 300 s.

In a first embodiment, for producing a coated steel sheet, the method comprises, between the step of heating the sheet up to the partitioning temperature PT for the partitioning time Pt, and the step of cooling the sheet to the room temperature, a step of hot dip coating the sheet.

In a preferred embodiment, the method according to the invention is such that the hot dip coating step is a galvanizing step.

In another embodiment, the method according to the invention is such that, hot dip coating step is done using an Al or Al alloyed bath.

In a second embodiment, for producing a coated steel sheet, the method comprising, after the sheet is cooled to the room temperature, a step of coating the sheet either by electro-galvanizing or vacuum coating.

In a preferred embodiment, the method according to the invention is such that the sum of martensite and bainite is at least 65%.

The object of the invention also relates to a steel sheet wherein the chemical composition of the steel contains in weight %:

$0.15\% \leq C \leq 0.25\%$ $1.2\% \leq Si \leq 1.8\%$ $2\% \leq Mn \leq 2.4\%$ $0.1 \leq Cr \leq 0.25\%$ $Al \leq 0.5\%$ the balance being Fe and unavoidable impurities, wherein the microstructure comprises of between 5% and 25% of intercritical ferrite, at least 50% of partitioned martensite, at least 10% of residual austenite, less than 10% of fresh martensite, and bainite, the sum of partitioned martensite and bainite being at least 60%.

Preferably, the steel sheet according to the invention is such that: $0.17\% \leq C \leq 0.21\%$.

In another embodiment, the steel sheet according to the invention is such that: $1.3\% \leq Si \leq 1.6\%$.

In another embodiment, the steel sheet according to the invention is such that: $2.1\% \leq Mn \leq 2.3\%$.

In a preferred embodiment, the steel sheet according to the invention is coated with a Zn or Zn alloy or even with an Al or Al alloy.

In a preferred embodiment, the steel sheet according to the invention has a yield strength of at least 550 MPa, a tensile strength of at least 980 MPa, a uniform elongation of at least 12%, a total elongation of at least 18%, and a hole expansion ratio of at least 30%.

In a preferred embodiment, the steel sheet according to the invention is such that the sum of martensite and bainite is at least 65%.

The invention also has as an object the use of a steel sheet or the production method described to make parts for automotive body in white.

According to another aspect, the invention relates to a method for producing a coated steel sheet having a microstructure containing between 5% and 25% of intercritical ferrite, at least 10% of retained austenite and at least 65% of martensite and bainite by heat treating and coating a steel sheet wherein the chemical composition of the steel contains in weight %:

$$0.15\% \leq C \leq 0.25\%$$

$$1.2\% \leq Si \leq 1.8\%$$

$$2\% \leq Mn \leq 2.4\%$$

$$0.1\% \leq Cr \leq 0.25\%$$

$$Al \leq 0.5\%$$

the balance being Fe and unavoidable impurities, and wherein the heat treatment and coating operations comprise the successive following steps:

Heating and annealing the sheet at an annealing temperature TA between TA1=Ac3−0.45*(Ms−QT) where QT is the quenching temperature between 180° C. and 300° C. and TA2=830° C. for a time of more than 30 sec, quenching the sheet by cooling it down to the quenching temperature QT heating the sheet up to a partitioning temperature PT between 380° C. and 480° C. for a partitioning time Pt between 10 sec and 300 sec coating the sheet either by electro-galvanizing or vacuum coating after cooling to the room temperature or by hot dip coating the sheet and then cooling it down to the room temperature Preferably, the method according to the invention is such that: 0.17%≤C≤0.21%.

In another embodiment, the method according to the invention is such that: 1.3%≤Si≤1.6%.

In another embodiment, the method according to the invention is such that: 2.1%≤Mn≤2.3%.

In a preferred embodiment, the method according to the invention is such that the partitioning temperature PT is between 430° C. and 480° C. for a partitioning time between 10 s and 90 s.

In another embodiment, the method according to the invention is such that the partitioning temperature PT is between 380° C. and 430° C. for a partitioning time between 10 s and 300 s.

In a preferred embodiment, the method according to the invention is such that the hot dip coating step is a galvanizing or galvannealing step.

In another embodiment, the method according to the invention is such that, hot dip coating step is done using an Al or Al alloyed bath.

According to this aspect, the object of the invention also relates to a steel sheet wherein the chemical composition of the steel contains in weight %:

$$0.15\% \leq C \leq 0.25\%$$

$$1.2\% \leq Si \leq 1.8\%$$

$$2\% \leq Mn \leq 2.4\%$$

$$0.1 \leq Cr \leq 0.25\%$$

$$Al \leq 0.5\%$$

the balance being Fe and unavoidable impurities, wherein the microstructure comprises of between 5% and 25% of intercritical ferrite, at least 10% of residual austenite and at least 65% of combined martensite and bainite Preferably, the steel sheet according to the invention is such that: 0.17%≤C≤0.21%.

In another embodiment, the steel sheet according to the invention is such that: 1.3%≤Si≤1.6%.

In another embodiment, the steel sheet according to the invention is such that: 2.1%≤Mn≤2.3%.

In a preferred embodiment, the steel sheet according to the invention is coated with a Zn or Zn alloy or even with an Al or Al alloy.

In a preferred embodiment, the steel sheet according to the invention has a yield strength of at least 550 MPa, a tensile strength of at least 980 MPa, a uniform elongation of at least 12% and a total elongation of at least 18%.

The invention will now be described in details but without introducing limitations, in view of the FIG. 1 which illustrates, for the same steel composition, the couple (tensile strength—hole expansion ratio) that can be obtained according to the manufacturing process of the invention, as compared to a process which does not include a step of quenching and martensite partitioning.

According to the invention, the sheet is obtained by hot rolling and cold rolling of a semi product which chemical composition contains, in weight %:

0.15 to 0.25% of carbon, and preferably 0.17% to 0.21%, to ensure a satisfactory strength and improve the stability of the retained austenite. This retained austenite content is necessary to obtain sufficient uniform and total elongations. If carbon content is above 0.25%, the hot rolled sheet is too hard to cold roll and the weldability is insufficient. If carbon content is below 0.15%, yield and tensile strength levels will not reach respectively 550 and 980 MPa.

1.2% to 1.8%, preferably 1.3% to 1.6% of silicon in order to stabilize the austenite, to provide a solid solution strengthening and to delay the formation of carbides during overaging without formation of silicon oxides at the surface of the sheet which is detrimental to coatability.

2% to 2.4% and preferably 2.1% to 2.3% of manganese. The minimum is defined to have a sufficient hardenability in order to obtain a microstructure containing at least 65% of martensite and bainite, tensile strength of more than 980 MPa and the maximum is defined to avoid having segregation issues which are detrimental for the ductility if Mn content is above 2.3%.

0.1% to 0.25% of chromium is necessary. At least 0.1% is needed to increase the hardenability and to stabilize the retained austenite in order to delay the formation of bainite during overaging. A maximum of 0.25% of Cr is allowed, above a saturation effect is noted, and adding Cr is both useless and expensive.

up to 0.5% of aluminum which is usually added to liquid steel for the purpose of deoxidation. Preferably, the Al content is limited to 0.05%. If the content of Al is above 0.5%, the austenitizing temperature will be too high to reach during annealing and the steel will become industrially difficult to produce.

The balance is iron and residual elements resulting from the steelmaking. In this respect, Ni, Mo, Cu, Nb, V, Ti, B, S, P and N at least are considered as residual elements which are unavoidable impurities. Therefore, their contents are less than 0.05% for Ni, 0.02% for Mo, 0.03% for Cu, 0.007% for V, 0.0010% for B, 0.005% for S, 0.02% for P and 0.010% for N. Nb content is limited to 0.05% and Ti content is limited to 0.05% because above such values large precipitates will form and formability will decrease, making the 18% of total elongation more difficult to reach.

The sheet is prepared by hot rolling and cold rolling according to the methods known by those which are skilled in the art.

Optionally, the hot rolled sheet is batch annealed before cold rolling at a temperature TBA in the range 550° C.-650° C. for more than 5 hours to ensure a better cold-rollability of the hot rolled sheets.

After rolling the sheets are pickled or cleaned then heat treated and either hot dip coated, electro-coated or vacuum coated.

The heat treatment which is made preferably on a combined continuous annealing and hot dip coating line comprising the steps of:

Annealing the sheet at an annealing temperature TA between TA1=Ac3−0.45*(Ms−QT) and TA2=830° C. where:

$Ac3=910-203[C]^{1/2}-15.2[Ni]+44.7[Si]+104[V]+31.5[Mo]+13.1[W]-30[Mn]-11[Cr]-20[Cu]+700[P]+400[Al]+120[As]+400[Ti]$ $Ms=539-423[C]-30.4[Mn]-17.7[Ni]-12.1[Cr]-11[Si]-7.5[Mo]$

QT must be between 180° and 300° C.

Chemical composition elements are given in wt %.

This is to ensure a maximum fraction of 25% of intercritical ferrite and to ensure a minimum of 5% of intercritical ferrite i.e. ferrite formed during an intercritical annealing between approximately 721° C. and Ac3. The sheet is maintained at the annealing temperature i.e. maintained between TA−5° C. and TA+10° C., for a time sufficient to homogenize the chemical composition and the microstructure. This time is of more than 30 sec but preferably does not need to be of more than 300 sec.

Quenching the sheet by cooling down to the quenching temperature QT which is between 180° C. and 300° C. Such temperature is lower than the Ms transformation point and is reached at a cooling rate high enough to avoid polygonal ferrite and bainite formation during cooling. Cr is helpful to avoid such formation. By quenching, it is meant a cooling rate higher than 30° C./s. The quenching temperature is between 180° C. and 300° C. in order to have, just after quenching, a microstructure consisting of intercritical ferrite, of martensite, and of austenite. If the quenching temperature QT is lower than 180° C., the fraction of the partitioned martensite in the final structure is too high to stabilize a sufficient amount of retained austenite above 10%. Moreover, if the quenching temperature QT is higher than 300° C., the fraction of partitioned martensite is too low to obtain the desired tensile and damaging properties.

Then, from this quenching temperature, the steel is reheated up to a partitioning temperature PT between 380° C. and 480° C. and preferably between 430° C. and 480° C. if the sheet is to be hot dip coated. During this partitioning step, the carbon diffuses from the martensite towards the remaining austenite. Thus, during this step, a partitioned martensite having a carbon content lower than the nominal content of the sheet, is created, while at the same time an enriched austenite phase having a higher carbon content than the nominal carbon content of the steel, is created.

For example, the partitioning temperature can be equal to the temperature at which the sheet must be heated in order to be hot dip coated, i.e. between 455° C. and 465° C. On the other hand, the partitioning temperature can be lowered, i.e. soaked between 380° C. and 430° C. if the sheet is to be further electro-galvanized or if the sheet is not coated. The reheating rate can be high when the reheating is made by induction heater, but that reheating rate had no effect on the final properties of the sheet.

The sheet is maintained at the partitioning temperature PT for a time Pt between 10 sec and 300 sec and preferably between 10 sec and 90 sec if the sheet is to be hot dip coated. In case of hot dip coated steel, the partitioning temperature PT is preferably between 430° C. and 480° C. Maintaining the sheet at the partitioning temperature involves that during partitioning the temperature of the sheet remains between PT−20° C. and PT+20° C.

Optionally, the temperature of the sheet is adjusted by cooling or heating in order to be equal to the temperature at which the sheet has to be hot dip coated, if such coating method is chosen.

In this case, the hot dip coating can be, for example, galvanizing but all metallic hot dip coating is possible provided that the temperatures at which the sheet is brought to during coating remain less than 480° C. When the sheet is galvanized, it is done with the usual conditions. The steel according to the invention can also galvanized with Zn alloys like zinc-magnesium or zinc-magnesium-aluminum.

Finally, the steel is cooled down to room temperature. During this step, some austenite that has been enriched in carbon in the partition step, is transformed into fresh martensite. Thus, the fresh martensite has a higher C content than the carbon content of the nominal composition.

The cooling rate is of at least 25° C./s to avoid an auto-tempering effect of the fresh martensite occurring during final cooling. If the steel is hot dip coated, then the steel is cooled down to 300° C. according to the known art in order for the coating to solidify appropriately and then cooled down to room temperature with a cooling rate of at least 25° C./s to avoid the auto-tempering of the fresh martensite. Such effect could affect the tensile properties and especially lower the ductility.

If the steel sheet is not coated by hot-dip, but for example to be coated by electrochemical or vacuum process, or to remain uncoated, the sheet is directly cooled after the partitioning step with a cooling rate higher than 25° C./s, for the same reason of avoiding a too high degree of self-tempering of the fresh martensite.

Instead of using hot dip coating, the sheet can be coated by electrochemical methods, for example electro-galvanizing, or through any vacuum coating process, like PVD or Jet Vapor Deposition, after the cooling step. There again, any kind of coatings can be used and in particular, zinc or zinc alloys, like zinc-nickel, zinc-magnesium or zinc-magnesium-aluminum alloys.

After partitioning and cooling to the room temperature, whatever the coating method mentioned above, or if the sheet is not coated, the steel sheet according to the invention shall contain: at least 10% of residual austenite, 5 to 25% of intercritical ferrite, at least 50% of partitioned martensite (i.e. martensite having a carbon content lower than the nominal carbon content), less than 10% of fresh martensite (i.e. martensite having a carbon content higher than the nominal carbon content) and bainite, the sum (i.e. combination) of partitioned martensite and bainite being at least 60%.

In order to obtain stable mechanical properties, the sum of martensite (i.e. partitioned and fresh) and of bainite is at least 65%.

Steel sheets according to the invention have a yield strength YS of at least 550 MPa, a tensile strength TS of at least 980 MPa, a uniform elongation UE of at least 12%, a total elongation TE of at least 18% and a hole expansion ratio HER of at least 30%.

The following examples are for the purposes of illustration and are not meant to be construed to limit the scope of the disclosure herein:

As an example, a sheet of 1.2 mm in thickness has the following composition: C=0.19%, Si=1.5% Mn=2.2%, Cr=0.2%, Al=0.030% the balance being Fe and impurities. All the impurity elements such as Cu, Ni, B, Nb, Ti, V; etc. . . . have a content below 0.05%. The steel was manufactured by hot and cold rolling. The theoretical Ms Transformation point of this steel is 369° C. and the calculated Ac3 point is 849° C.

Samples of the sheet were heat treated by annealing, quenching and partitioning then hot dip galvanized or electro-galvanized, the cooling rate after the partitioning step being higher than 25° C./s. The microstructure were quantified and the mechanical properties were measured.

The conditions of annealing treatment are reported at table I, the microstructures obtained are summarized in table II and the mechanical properties are in table Ill. Examples 1 to 15 have been hot dip coated by galvanizing at 460° C. (GI) and examples 16 to 30 have been electro-galvanized (EZ) after the annealing.

The numbers bold and underlined are not according to the invention.

TABLE I

| Sample | TA1 °C. | TA °C. | QT °C. | PT °C. | Pt sec |
|---|---|---|---|---|---|
| 1 | 773 | 800 | 201 | 400 | 275 |
| 2 | 794 | 800 | 247 | 400 | 275 |
| 3 | 816 | 800 | 297 | 400 | 275 |
| 4 | 773 | 825 | 200 | 400 | 275 |
| 5 | 793 | 825 | 245 | 400 | 275 |
| 6 | 817 | 825 | 299 | 400 | 275 |
| 7 | 773 | 835 | 200 | 400 | 275 |
| 8 | 795 | 835 | 253 | 400 | 275 |
| 9 | 818 | 835 | 306 | 400 | 275 |
| 10 | 771 | 850 | 196 | 400 | 275 |
| 11 | 788 | 850 | 234 | 400 | 275 |
| 12 | 792 | 850 | 242 | 400 | 275 |
| 13 | 794 | 870 | 247 | 400 | 275 |
| 14 | 808 | 870 | 278 | 400 | 275 |
| 15 | 815 | 870 | 293 | 400 | 275 |
| 16 | 773 | 800 | 200 | 460 | 50 |
| 17 | 795 | 800 | 250 | 460 | 30 |
| 18 | 795 | 800 | 250 | 460 | 50 |
| 19 | 818 | 800 | 300 | 460 | 50 |
| 20 | 773 | 825 | 200 | 460 | 50 |
| 21 | 795 | 825 | 250 | 460 | 30 |
| 22 | 795 | 825 | 250 | 460 | 50 |
| 23 | 818 | 825 | 300 | 460 | 50 |
| 24 | 792 | 850 | 242 | 460 | 50 |
| 25 | 772 | 850 | 198 | 460 | 50 |
| 26 | 778 | 870 | 211 | 460 | 50 |
| 27 | 790 | 870 | 238 | 460 | 50 |
| 28 | 800 | 870 | 260 | 460 | 50 |
| 29 | 814 | 850 | 291 | 460 | 50 |
| 30 | 815 | 870 | 294 | 460 | 50 |
| 31 | — | 800 | — | 400 | 300 |
| 32 | — | 825 | — | 400 | 300 |
| 33 | — | 850 | — | 400 | 300 |

TABLE II

| Sample | F % | A % | PM % | FM % | B % | PM + B % | M + B % |
|---|---|---|---|---|---|---|---|
| 1 | 19 | 10 | 70 | 1 | 0 | 70 | 71 |
| 2 | 21 | 13 | 63 | 2 | 1 | 64 | 66 |
| 3 | 20 | 16 | 36 | 7 | 21 | 57 | 64 |
| 4 | 10 | 10 | 79 | 1 | 0 | 79 | 80 |
| 5 | 9 | 13 | 70 | 7 | 1 | 71 | 78 |
| 6 | 9 | 16 | 52 | 5 | 18 | 70 | 75 |
| 7 | 2 | 8 | 84 | 6 | 0 | 84 | 90 |
| 8 | 3 | 11 | 72 | 9 | 5 | 77 | 86 |
| 9 | 2 | 15 | 54 | 12 | 17 | 71 | 83 |
| 10 | 0 | 5 | 85 | 10 | 0 | 85 | 95 |
| 11 | 0 | 7 | 77 | 12 | 4 | 81 | 93 |
| 12 | 0 | 9 | 74 | 11 | 6 | 80 | 91 |
| 13 | 0 | 9 | 73 | 9 | 9 | 82 | 91 |
| 14 | 0 | 10 | 62 | 8 | 20 | 82 | 90 |
| 15 | 0 | 12 | 58 | 7 | 23 | 81 | 88 |
| 16 | 20 | 10 | 69 | 1 | 0 | 69 | 70 |
| 17 | 20 | 14 | 61 | 2 | 3 | 64 | 66 |
| 18 | 19 | 13 | 60 | 3 | 5 | 65 | 68 |
| 19 | 20 | 18 | 35 | 6 | 21 | 56 | 62 |
| 20 | 9 | 10 | 78 | 3 | 0 | 78 | 81 |
| 21 | 9 | 12 | 71 | 5 | 3 | 74 | 79 |
| 22 | 10 | 13 | 72 | 4 | 1 | 73 | 77 |
| 23 | 10 | 16 | 53 | 5 | 16 | 69 | 74 |
| 24 | 0 | 12 | 75 | 6 | 7 | 82 | 88 |
| 25 | 0 | 5 | 84 | 11 | 0 | 84 | 95 |
| 26 | 0 | 6 | 81 | 11 | 2 | 83 | 94 |
| 27 | 0 | 8 | 76 | 9 | 7 | 83 | 92 |
| 28 | 0 | 10 | 70 | 8 | 12 | 82 | 90 |
| 29 | 0 | 12 | 58 | 12 | 18 | 76 | 88 |
| 30 | 0 | 12 | 56 | 13 | 19 | 75 | 88 |
| 31 | 19 | 15 | 0 | 11 | 55 | 55 | 66 |
| 32 | 8 | 16 | 0 | 17 | 59 | 59 | 76 |
| 33 | 0 | 14 | 0 | 15 | 71 | 71 | 86 |

TABLE III

| Sample | YS MPa | TS MPa | UE % | TE % | HE % | Steel |
|---|---|---|---|---|---|---|
| 1 | 708 | 1074 | 13.2 | 20.3 | 47.9 | Invention |
| 2 | 596 | 1059 | 13.5 | 20.6 | 30.4 | Invention |
| 3 | 518 | 1040 | 13.3 | 19.8 | 26.5 | Reference |
| 4 | 786 | 1125 | 12.1 | 19.4 | 40.5 | Invention |
| 5 | 747 | 1078 | 12.5 | 19.6 | 35.6 | Invention |
| 6 | 637 | 1081 | 12.2 | 18.6 | 31.1 | Invention |
| 7 | 906 | 1145 | 8.6 | 16.3 | 48.7 | Reference |
| 8 | 876 | 1148 | 9.1 | 16.2 | 45.6 | Reference |
| 9 | 852 | 1131 | 9.4 | 16.5 | 40.3 | Reference |
| 10 | 1145 | 1321 | 3.8 | 11.4 | 55.6 | Reference |
| 11 | 1171 | 1316 | 5.7 | 12.2 | 54.3 | Reference |
| 12 | 1101 | 1260 | 4.8 | 11.5 | 51.7 | Reference |
| 13 | 1156 | 1306 | 6.4 | 12.4 | 62.3 | Reference |
| 14 | 1057 | 1250 | 8.0 | 13.9 | 61.7 | Reference |
| 15 | 1045 | 1210 | 6.0 | 12.7 | 60.9 | Reference |
| 16 | 555 | 1074 | 13.0 | 20.1 | 32.1 | Invention |

TABLE III-continued

| Sample | YS MPa | TS MPa | UE % | TE % | HE % | Steel |
|---|---|---|---|---|---|---|
| 17 | 559 | 1095 | 13.2 | 19.8 | 31.2 | Invention |
| 18 | 552 | 1079 | 12.7 | 18.8 | 30.7 | Invention |
| 19 | 523 | 1084 | 12.6 | 18.9 | 26.9 | Reference |
| 20 | 625 | 1112 | 12.1 | 18.7 | 34.6 | Invention |
| 21 | 611 | 1133 | 13.1 | 20.0 | 31.2 | Invention |
| 22 | 577 | 1095 | 12.8 | 19.7 | 32.2 | Invention |
| 23 | 553 | 1137 | 12.1 | 18.2 | 30.8 | Invention |
| 24 | 1038 | 1199 | 8.7 | 16.0 | 48.5 | Reference |
| 25 | 1101 | 1226 | 7.7 | 15.1 | 53.2 | Reference |
| 26 | 1018 | 1166 | 8.2 | 14.9 | 53.2 | Reference |
| 27 | 1067 | 1209 | 8.6 | 16.1 | 54.8 | Reference |
| 28 | 1001 | 1181 | 7.6 | 14.5 | 54.4 | Reference |
| 29 | 898 | 1184 | 10.0 | 16.6 | 50.2 | Reference |
| 30 | 881 | 1179 | 9.9 | 16.6 | 51.4 | Reference |
| 31 | 577 | 1091 | 14.0 | 19.4 | 22.3 | Reference |
| 32 | 679 | 1102 | 11.3 | 15.6 | 22.0 | Reference |
| 33 | 908 | 1186 | 8.8 | 13.2 | 23.8 | Reference |

In these tables, TA is the annealing temperature, TA1 is the lower annealing temperature limit, QT is the quenching temperature, PT the partitioning temperature, Pt the time of maintaining at the partitioning temperature, YS is the yield strength, TS is the tensile strength, UE is the uniform elongation, TE is the total elongation.

The microstructures fractions relate to the final microstructure of the sheet, i.e. after cooling down at room temperature: F is the fraction of intercritical ferrite, A is the fraction of retained austenite, FM is the fraction of fresh martensite, PM is the fraction of partitioned martensite, M is the martensite, i.e. the sum of fresh and partitioned martensite, B is the fraction of bainite.

Samples 1, 2, 4, 5, 6, 16, 17, 18, 20, 21, 22 and 23 which are either galvanized or electro-galvanized show that in order to obtain the desired properties and more specifically the ductility properties, the annealing temperature TA has to be set accordingly with the quench temperature QT. Whatever the partitioning temperature PT chosen, the lower the TA temperature, the lower the QT temperature. Matching the TA temperature and the QT temperature allows obtaining an adequate fraction of partitioned martensite after the quench in regards to the fraction of intercritical ferrite obtain at the end of the intercritical annealing, i.e. the higher the ferrite fraction, the higher the partitioned martensite fraction for the sheet to have high strength, sufficient ductility and high hole expansion properties.

Samples 7 to 15 and 24 to 30 show that annealing temperatures above 830° C. lead to a fraction of intercritical ferrite too small to ensure enough ductility. On the other hand, samples 3 and 19 show that if the annealing temperature is lower than the one calculated with the relation TA1=Ac3−0.45*(Ms−QT), the YS is lower than 550 MPa. Indeed, a low annealing temperature TA combined with a high quench temperature QT lead to low fraction of partitioned martensite and therefore the combination of fractions of partitioned martensite and bainite is too low to ensure yield strength above 550 MPa. Moreover, decreasing the partitioned martensite fraction degrades the resistance to damage, resulting in hole expansion ratios below 30%.

Samples 31, 32 and 33 are examples of different microstructures able to obtain the desired properties YS and TS but not the desired hole expansion ratio. In these examples, the thermal cycle differs from the one of the invention by avoiding the quenching step at the quenching temperature QT, i.e. the sheet is directly cooled down to the partitioning temperature PT and hold for a time Pt before cooling down to the room temperature. Such thermal cycles lead to a microstructure consisting in intercritical ferrite F, bainite B, retained austenite A and fresh martensite FM, which exhibits similar tensile properties but lower damaging properties. Indeed, the absence of partitioned martensite in the microstructure degrades the damaging properties of the sheet thus decreasing the hole expansion ratio, as is illustrated by FIG. 1, which shows the Hole Expansion Ratio HER versus the tensile strength TS of the examples of the invention (Samples 1, 2, 4, 5, 6, 16, 17, 18, 20, 21, 22 and 23) and Samples 31, 32 and 33.

Samples 16, 17, 18, 20, 21, 22 and 23 show that with a partitioning temperature of 460° C. and a partition time between 10 sec and 60 sec it is possible to obtain the desired properties of the galvanized sheets.

On the other hand, samples 1, 2, 4, 5 and 6 show that with a partition temperature of 400° C. and a partitioning time between 10 s and 300 s it is also possible to obtain the desired properties. Steel according to the invention can be used to make parts for automotive body in white.

What is claimed is:

1. A coated steel sheet comprising:
   a chemical composition of the steel including in weight %:

$0.15\% \leq C \leq 0.25\%$;

$1.2\% \leq Si \leq 1.8\%$;

$2\% \leq Mn \leq 2.4\%$;

$0.1\% \leq Cr \leq 0.25\%$; and $Al \leq 0.5\%$;

a balance being Fe and unavoidable impurities;
   a microstructure including between 5% and 25% of intercritical ferrite, at least 50% of tempered martensite, at least 10% of residual austenite, less than 10% of fresh martensite and 0% or more of bainite, the fresh martensite being not auto-tempered, a sum of tempered martensite and bainite being of at least 60%;
   wherein the coated steel sheet is coated with Zn or a Zn alloy, the coated steel sheet being hot-dip galvanized;
   wherein the coated steel sheet has a yield strength of at least 550 MPa, a tensile strength of at least 980 MPa, a uniform elongation of at least 12%, a total elongation of at least 18%, and a hole expansion ratio of at least 30%, the hole expansion ratio being measured according to the standard ISO16630:2009.

2. The coated steel sheet according to claim 1, wherein the chemical composition of the steel includes $0.17\% \leq C \leq 0.21\%$.

3. The coated steel sheet according to claim 1, wherein the chemical composition of the steel includes $1.3\% \leq Si \leq 1.6\%$.

4. The coated steel sheet according to claim 1, wherein the chemical composition of the steel includes $2.1\% \leq Mn \leq 2.3\%$.

5. The coated steel sheet according to claim 1, wherein the sum of martensite and bainite is at least 65%.

6. The coated steel sheet according to claim 1, wherein the microstructure includes at least 10% of intercritical ferrite.

7. The coated steel sheet according to claim 1, wherein the microstructure includes at least 19% of intercritical ferrite.

8. The coated steel sheet according to claim 1, wherein the microstructure includes 1% or more and less than 10% of fresh martensite, the fresh martensite being not auto-tempered.

9. The coated steel sheet according to claim 1, wherein the microstructure includes 3% or less of bainite.

10. The coated steel sheet according to claim 1, wherein the product of the Tensile Strength by the Total Elongation is 21815 MPa*% or less.

11. The coated steel sheet according to claim 1, wherein the microstructure includes at least 9% of intercritical ferrite, at least 52% of tempered martensite, and at least 1% of fresh martensite, the fresh martensite being not auto-tempered.

12. The coated steel sheet according to claim 1, wherein the microstructure includes 21% or less of intercritical ferrite, 79% or less of tempered martensite, 16% or less of residual austenite, 7% or less of fresh martensite, the fresh martensite being not auto-tempered, and 18% or less of bainite.

13. The coated steel sheet according to claim 11, wherein the microstructure includes 21% or less of intercritical ferrite, 79% or less of tempered martensite, 16% or less of residual austenite, 7% or less of fresh martensite, the fresh martensite being not auto-tempered, and 18% or less of bainite.

14. The coated steel sheet according to claim 1, wherein the coated steel sheet has a yield strength of at least 596 MPa, a tensile strength of at least 1059 MPa, a uniform elongation of at least 12.1%, a total elongation of at least 18.6%, and a hole expansion ratio of at least 30.4%, the hole expansion ratio being measured according to the standard ISO16630:2009.

15. The coated steel sheet according to claim 13, wherein the coated steel sheet has a yield strength of at least 596 MPa, a tensile strength of at least 1059 MPa, a uniform elongation of at least 12.1%, a total elongation of at least 18.6%, and a hole expansion ratio of at least 30.4%, the hole expansion ratio being measured according to the standard ISO16630:2009.

16. A coated steel sheet comprising:
a chemical composition of the steel including in weight %:

$0.15\% \leq C \leq 0.25\%$;

$1.2\% \leq Si \leq 1.8\%$;

$2\% \leq Mn \leq 2.4\%$;

$0.1\% \leq Cr \leq 0.25\%$; and $Al \leq 0.5\%$;

a balance being Fe and unavoidable impurities;
a microstructure including between 5% and 25% of intercritical ferrite, at least 50% of tempered martensite, at least 10% of residual austenite, less than 10% of fresh martensite and 0% or more of bainite, the fresh martensite being not auto-tempered, a sum of tempered martensite and bainite being of at least 60%;
wherein the coated steel sheet is coated with Zn or a Zn alloy, the coated steel sheet being electro-galvanized;
wherein the coated steel sheet has a yield strength of at least 550 MPa, a tensile strength of at least 980 MPa, a uniform elongation of at least 12%, a total elongation of at least 18%, and a hole expansion ratio of at least 30%, the hole expansion ratio being measured according to the standard ISO16630:2009.

17. The coated steel sheet according to claim 16, wherein the microstructure includes at least 9% of intercritical ferrite, at least 53% of tempered martensite, at least 1% of fresh martensite, the fresh martensite being not auto-tempered.

18. The coated steel sheet according to claim 16, wherein the microstructure includes 20% or less of intercritical ferrite, 78% or less of tempered martensite, 16% or less of residual austenite, 5% or less of fresh martensite, the fresh martensite being not auto-tempered, and 16% or less of bainite.

19. The coated steel sheet according to claim 17, wherein the microstructure includes 20% or less of intercritical ferrite, 78% or less of tempered martensite, 16% or less of residual austenite, 5% or less of fresh martensite, the fresh martensite being not auto-tempered, and 16% or less of bainite.

20. The coated steel sheet according to claim 16, wherein the coated steel sheet has a yield strength of at least 552 MPa, a tensile strength of at least 1074 MPa, a uniform elongation of at least 12.1%, a total elongation of at least 18.2%, and a hole expansion ratio of at least 30.7%, the hole expansion ratio being measured according to the standard ISO16630:2009.

21. The coated steel sheet according to claim 19, wherein the coated steel sheet has a yield strength of at least 552 MPa, a tensile strength of at least 1074 MPa, a uniform elongation of at least 12.1%, a total elongation of at least 18.2%, and a hole expansion ratio of at least 30.7%, the hole expansion ratio being measured according to the standard ISO16630:2009.

22. The coated steel sheet according to claim 16, wherein a product of the tensile strength by the total elongation is 22660 MPa*% or less.

23. A steel sheet comprising:
a chemical composition of the steel including in weight %:

$0.15\% \leq C \leq 0.25\%$;

$1.2\% \leq Si \leq 1.8\%$;

$2\% \leq Mn \leq 2.4\%$;

$0.1\% \leq Cr \leq 0.25\%$; and $Al \leq 0.5\%$;

a balance being Fe and unavoidable impurities;
a microstructure including between 5% and 25% of intercritical ferrite, at least 50% of tempered martensite, at least 10% of residual austenite, less than 10% of fresh martensite and 0% or more of bainite, the fresh martensite being not auto-tempered, a sum of tempered martensite and bainite being of at least 60%;
wherein the steel sheet has a yield strength of at least 550 MPa, a tensile strength of at least 980 MPa, a uniform elongation of at least 12%, a total elongation of at least 18%, a hole expansion ratio of at least 30%, the hole expansion ratio being measured according to the standard ISO16630:2009, and a product of the tensile strength by the total elongation of 22660 MPa*% or less.

24. A steel sheet comprising:
a chemical composition of the steel including in weight %:

$0.15\% \leq C \leq 0.25\%$;

$1.2\% \leq Si \leq 1.8\%$;

$2\% \leq Mn \leq 2.4\%$;

$0.1\% \leq Cr \leq 0.25\%$; and $Al \leq 0.5\%$;

a balance being Fe and unavoidable impurities;

a microstructure including between 5% and 25% of intercritical ferrite, at least 50% of tempered martensite, at least 10% of residual austenite, less than 10% of fresh martensite and 0% or more of bainite and 3% or less of bainite, a sum of tempered martensite and bainite being of at least 60%;

wherein the steel sheet has a yield strength of at least 550 MPa, a tensile strength of at least 980 MPa, a uniform elongation of at least 12%, a total elongation of at least 18%, a hole expansion ratio of at least 30%, the hole expansion ratio being measured according to the standard ISO16630:2009.

* * * * *